United States Patent [19]

Tanaka et al.

[11] Patent Number: 5,127,126
[45] Date of Patent: Jul. 7, 1992

[54] CONTACT LENS CLEANING INSTRUMENT

[75] Inventors: Toyoyasu Tanaka, Nagoya; Yasuyoshi Yamamoto, Komaki, both of Japan

[73] Assignee: Menicon Co., Ltd., Nagoya, Japan

[21] Appl. No.: 679,397

[22] Filed: Apr. 2, 1991

[30] Foreign Application Priority Data

Apr. 3, 1990 [JP] Japan ............................ 2-36231[U]

[51] Int. Cl.⁵ .................... G02C 13/00; A45C 11/04; A47L 25/00
[52] U.S. Cl. .................... 15/214; 15/104 R; 15/104.94; 15/104.001; 134/901
[58] Field of Search .......... 15/97.1, 21.2, 214, 15/104.94, 104.92, 104 R; 134/901; 401/9, 210 R

[56] References Cited

U.S. PATENT DOCUMENTS

| | | | |
|---|---|---|---|
| 3,695,280 | 10/1972 | Sturgeon | 134/901 |
| 4,196,487 | 4/1980 | Merriman | 15/104 R |
| 4,337,858 | 7/1982 | Thomas et al. | 134/901 |
| 4,473,917 | 10/1984 | Britton | 15/21.2 |
| 4,691,725 | 9/1987 | Parisi | 134/901 |
| 4,965,904 | 10/1990 | Tanaka et al. | 15/214 |

Primary Examiner—Edward L. Roberts
Attorney, Agent, or Firm—Nikaido, Marmelstein, Murray & Oram

[57] ABSTRACT

A cleaning instrument which can easily clean a lens in a short time without damaging the lens, which can clean both side surfaces of the lens at the same time, and which can serve also as a case for storing the lenses, includes a cleaning ball for cleaning a lens. A cleaning vessel is formed with a recessed cleaning chamber for housing a contact lens and the cleaning ball. The cleaning chamber has a bottom concave inner surface which is curved complementarily to the curvature of the lens so that the lens can be mounted in face-to-face contact therebetween.

15 Claims, 8 Drawing Sheets

CONTACT LENS CLEANING INSTRUMENT

BACKGROUND OF THE INVENTION

The present invention relates to a contact lens cleaning instrument.

A contact lens (hereinafter referred to as "lens") has been hitherto manually and carefully cleaned by means of a puff (like a powder puff) or the like which soaks in a cleaning medium.

Further, there has been known a device having elastomeric pads to be in contact with both surfaces of the contact lens and to be vibrated mechanically so that the contact lens is cleaned (Japanese Unexamined Utility Model Publication 125820/1988).

However, in case of cleaning by means of the puff, it is not easy to handle a lens, since the lens is small. Moreover, with manual cleaning, not only can the lens be easily damaged due to mistaken handling, but it takes much time to clean whole surfaces of the lens.

Further, when cleaning by means of the above-mentioned mechanical vibration, the lens and the pads are provided with regular relative motion. Therefore, unevenness of cleaning happens, and in some cases, there are some parts of the lens which are not cleaned well, and another parts of the lens which are not cleaned so well that sometimes a part is not cleaned.

The object of the present invention is to delete the above-mentioned disadvantages and to provide a cleaning instrument which can easily clean a lens in a short time without damaging the lens and further, which can clean both side surfaces of the lens at the same time. Another object of the present invention is to provide a cleaning instrument which serves also as a case for storing the lenses.

SUMMARY OF THE INVENTION

The cleaning instrument of the present invention comprises (a) a cleaning ball for cleaning a lens, (b) a cleaning vessel formed with a recessed cleaning chamber for housing a contact lens and the cleaning ball, (c) the chamber having a bottom concave inner surface which is complementarily curved to the curvature so that the contact lens can be mounted in face-to-face contact.

The instrument is used as follows:

Firstly, a cleaning medium is poured into the cleaning chamber of the cleaning vessel, and the lens and the cleaning ball are inserted in the cleaning vessel. Next, the cleaning vessel is held between the user's fingers and is shaken horizontally on a table by hand to that the cleaning vessel is vibrated. At the same time, since the cleaning ball is also vibrated, both outside and inside surfaces of the lens are rubbed with the bottom concave surface of the cleaning chamber and the cleaning ball, and the lens is cleaned.

At the time, the shaking movement by hand is not always uniform and either the direction of vibration or vibration vary remarkably. Therefore, both side surfaces of the lens are rubbed all the more thoroughly as compared with the mechanical vibration, and both side surfaces of the lens become clean, so that spots (or dirt) does not remain on the lens.

Furthermore, the cleaning instrument of the present invention can be used as a case for storing the lens, when the cleaning instrument is not used for cleaning.

That is, the cleaning vessel of the present invention can be considered as a case for storage of the lens.

Hereinafter, embodiments of the instrument of the present invention are explained with reference to the accompanying drawing.

DETAILED DESCRIPTION

Figure 1:
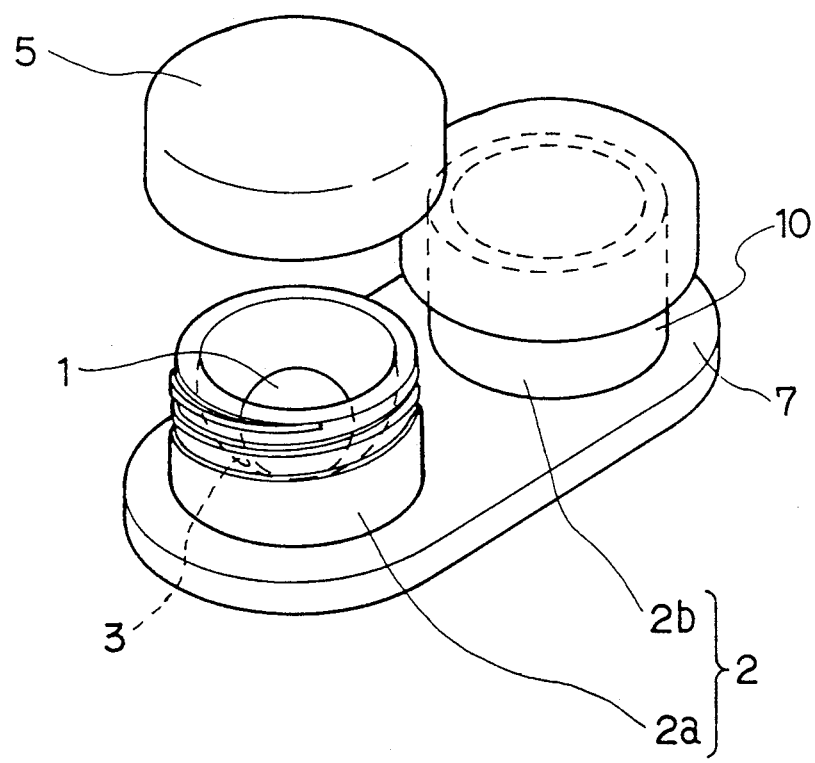
FIG. 1 is a perspective view showing an embodiment of the cleaning instrument of the present invention.
Figure 2:
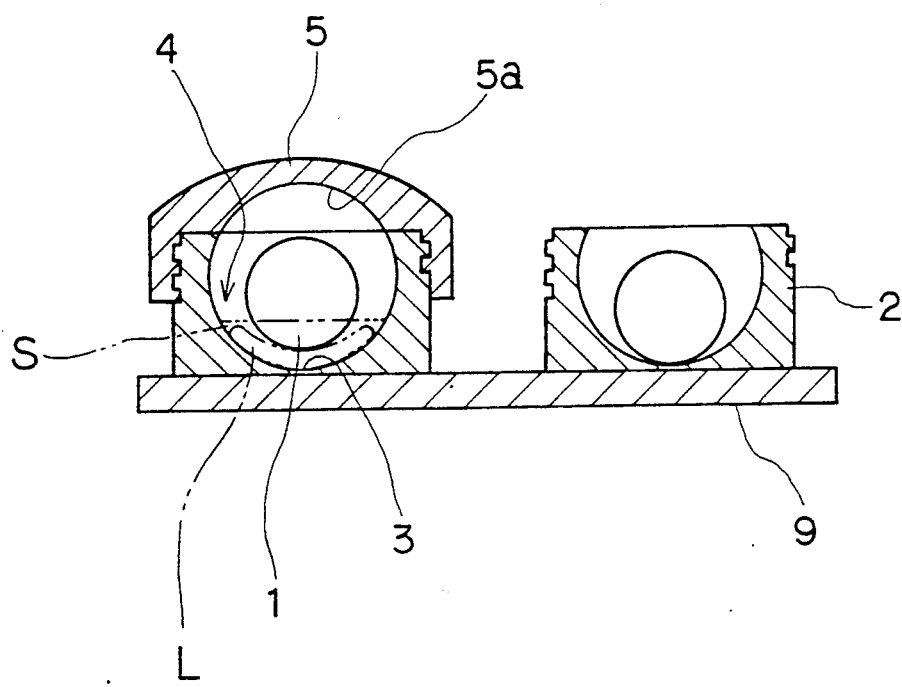
FIG. 2 is a partially sectional side elevation view showing the instrument of FIG. 1.

Referring to FIGS. 1 and 2, the numeral 1 designates a cleaning ball, and numeral 2 designates a cleaning vessel and the numeral 3 designates a bottom portion of a cleaning chamber 4 which is formed in the cleaning vessel 2.

The cleaning ball 1 is preferably formed as a spherical body. However, a slightly depressed ball having an ellipsoidal shape can be employed. It is preferable that a radius of curvature of the cleaning ball 1 is smaller than that of the above-mentioned bottom surface 3, and the radius is approximately 2 to 20 mm. For instance, in case one cleaning ball is used, it is preferable that the radius of the cleaning ball is approximately 0.5 to several mm smaller than the radius of curvature of the above-mentioned bottom portion 3.

Material of the cleaning ball is not limited, and various material, can be employed in accordance with the type (soft or hard contact lens) and hardness of lens. For example, glass or plastic (especially for soft contact lens), and a soft synthetic resin, a rubber or a foaming, material (especially for hard contact lens) can be employed as material of the cleaning ball.

When light material is used for the cleaning ball 1 such as a foaming material, it is preferable to have a weight embedded, such as a metal and the like, in the ball.

Further, the surface of the cleaning ball 1 can be provided with unevenness (or roughness) with mesh-like pattern and the like, in order to improve cleaning effect.

Figure 3:
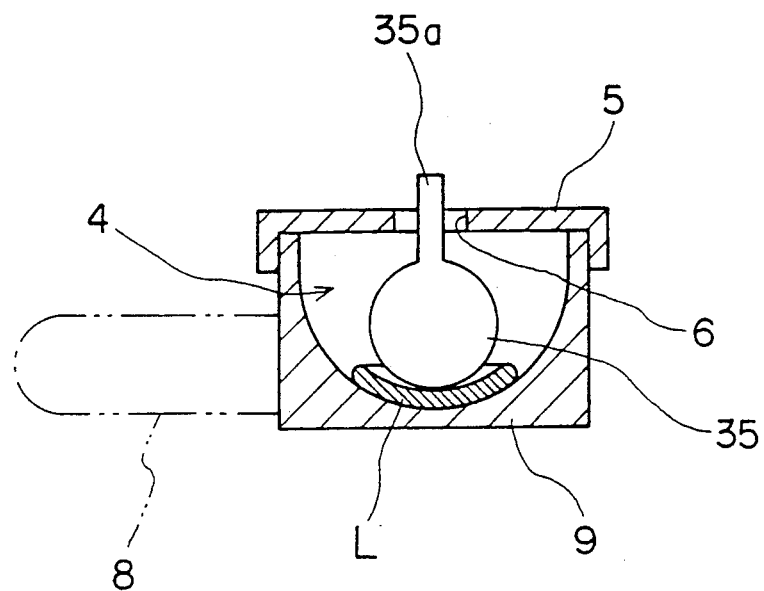
FIG. 3 is a sectional view showing another embodiment of a cleaning instrument of the present invention.

As shown in FIG. 3, when a cleaning ball 35 is provided with a stem 35a, the ball 35 can be conveniently handled. When the stem 35a is provided on the ball 35, at least a lower surface of the cleaning ball 35 is required to be spherical, and the upper surface can be made as a flat surface or the like. The words "cleaning ball" in the instant specification includes a body having such a shape.

The cleaning vessel 2 is a vessel to house a lens L and the cleaning ball 1 in order to clean the lens. The cleaning vessel 2 is formed with a recessed cleaning chamber 4, as shown in FIG. 2, and the bottom surface 3 of the chamber 4 is formed into a curved surface, such as a spherical surface or an ellipsoidal surface so as to obtain a face-to-face contact with the lens. The radius of curvature should normally be 7 to 20 mm in accordance with the lens. Material of the cleaning vessel 2 is not limited, and various material, for example, plastic or the like can be employed.

It is preferable that both volume and depth of the cleaning chamber 4 are slightly larger than that of the cleaning ball 1 so that the cleaning ball can move moderate, and bound and large rolling of the cleaning ball 1 are controlled.

Further, when the bottom surface of the cleaning chamber 4 is provided with the same unevenness, such as a mesh and the like, as the surface of the above-mentioned cleaning ball 1, the effect of cleaning lens is improved.

A cap 5 for covering the cleaning chamber 4 is detachably mounted on the upper portion of the cleaning vessel by means of engagement of threads or the like. The cap 5 is mounted, lest the lens L, the cleaning medium and the cleaning ball 1 should fly out from the cleaning chamber 4 when the cleaning vessel 2 is shaken by hand.

As to the cap 5, a snap engagement can be employed as a means for fixing the cap 5 to the cleaning vessel 2.

Further, an inside surface 5a of the cap 5 is preferably recessed such as a spherical surface or an ellipsoidal surface which is continuous to the inner surface of the cleaning vessel 2. Thereby, there is an advantage that the cleaning ball 1 is steadied smoothly, even if the cleaning ball 1 bounds. In that case, the inner surface 5a of the cap 5 is also operated as a cleaning chamber 4.

When a cleaning ball 35 having a stem 35a is used as shown in FIG. 3, it is preferable to be provided with a hole 6 at the center of the cap 5.

Thereby the stem 35a can be prevented from dropping into the cleaning chamber 4.

An external appearance and shape of the cleaning vessel 2 is not limited and, for example, a cylindrical shape or the like is employed so that a side portion 10 can be gripped. The cleaning vessel 2 of FIG. 2 is constructed such that two cleaning vessels 2a and 2b are integratedly coupled by a bottom plate 7. The cleaning vessel of this type can be shaken by gripping the side portion 10 of one of the cleaning vessels, or the common bottom plate 7.

When the side portion and the like are provided with a gripping portion (numeral 8 of FIG. 3), the cleaning vessel can be treated all the more easily.

It is preferable to form the cleaning vessel 2 so as to be relatively depressed, since shaking directions can be definite when the cleaning vessel 2 is horizontally shaked by fingers. Further, when a bottom surface 9 of the cleaning vessel 2 is flat, the cleaning vessel 2 can be shaked to that the cleaning vessel 2 is slided on a stand having a flat surface, such as a desk. Therefore, there is an advantage that the cleaning ball 1 and the lens L are prevented from bounding or rolling.

Next, a cleaning method using the above-mentioned cleaning instrument is explained.

Firstly, cleaning medium S is poured in the cleaning chamber 4, and the lens L is inserted into the cleaning chamber 4, then the cleaning ball 1 is put on the lens.

As the cleaning medium S, cleaning solution for contact lens is preferably used. Further, abrasive solution (solution including abrasive) can be used instead of the cleaning solution. The amount of the medium to be used is generally 0.03 to 1.0 cc.

Secondly, after the cap 5 is fastened, the cleaning vessel 2 is put on a stand having a flat surface, and then the cleaning vessel 2 is gripped and vibrated so as to be turned in the right and left directions. Therefore, the lens L is shaken on the bottom surface 3 and the cleaning ball 1 is vibrated on the lens L, and both outside and inside surfaces of the lens L are cleaned at the same time. The cleaning ball 1 has not only a function as a weight for controlling bound of the lens L but also a function as a mass element for providing relative motion between the cleaning chamber 4 and the lens L and between the lens and the ball during the vibration.

Under a normal condition, it is sufficient to clean for 30 to 60 seconds.

After cleaning, the lens L is taken out of the cleaning vessel 2 and washed in physiological saline water or purified water, then the lens L is used.

Further, when the cleaning ball 1 can be kept in another vessel then the cleaning vessel could be used as a case for storage.

Hereinafter, referring to FIG. 4, another embodiment of the cleaning instrument of the present invention is explained.

Figure 4:
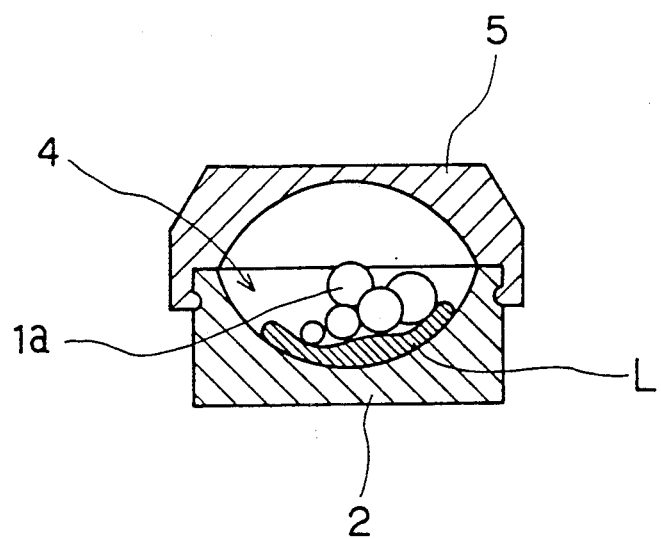
FIG. 4 is a sectional view showing another embodiment of the instrument of the present invention.

In case of the cleaning instrument of FIG. 4, several cleaning balls 1a, which are smaller than lens L, are contained in one cleaning chamber (Diameter of the cleaning ball is 1 to 3 mm). When a contact lens having a special design, such as a high plus power lens or a high minus power lens is cleaned, plural cleaning balls are preferably used.

Figure 5:
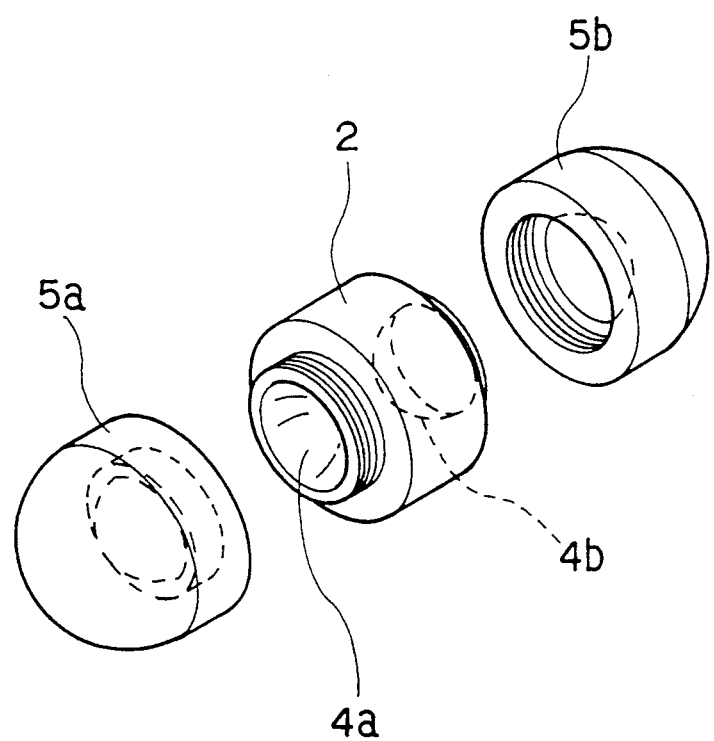
FIG. 5 is a perspective view showing another embodiment of the cleaning instrument of the present invention.
Figure 6:
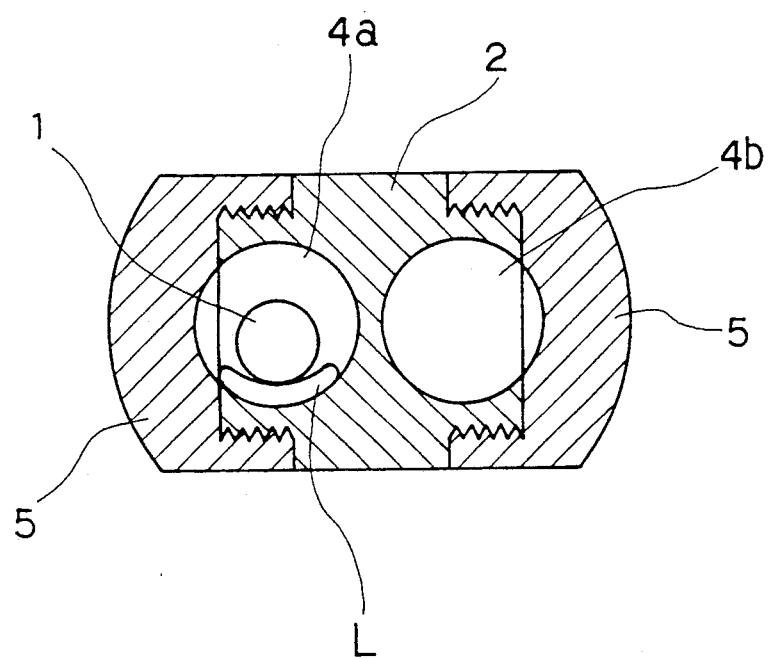
FIG. 6 is a sectional view showing the instrument of FIG. 5.

The cleaning instrument shown in FIGS 5 and 6 comprises a cylindrical cleaning vessel 2. The cleaning vessel 2 is provided with two cleaning chambers 4a and 4b at both right and left end portions such that the cleaning chambers 4a, 4b are directed toward opposite directions on the same shaft axis. On both right and left sides of the cleaning vessel 2 each cap 5a and 5b is provided by means of engagement of threads. The cleaning instrument is retained such that each cleaning vessel is upside or downside, and then the lens contained in the cleaning chamber 4a or 4b, which is the upper side, is cleaned. The cleaning instrument of FIGS. 5 and 6 is easy to carry and can be used as a case for storage. The above-mentioned cleaning instrument has an effect so that the contact lens can be cleaned when the contact lens is carried.

Figure 7:
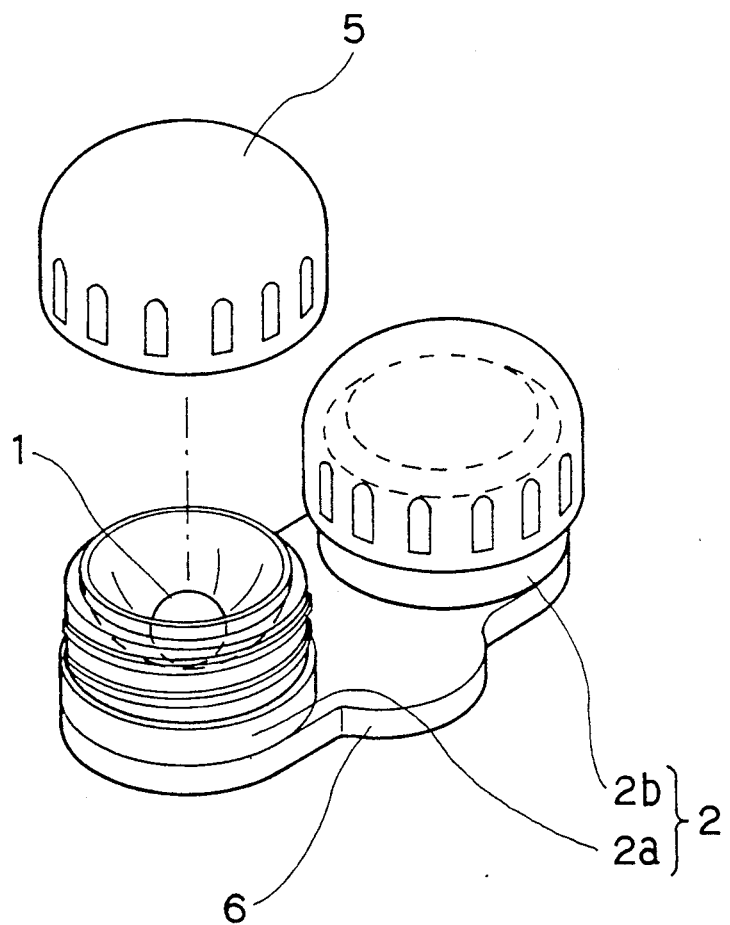
FIG. 7 is a perspective view showing another embodiment of the cleaning instrument of the present invention.
Figure 8:
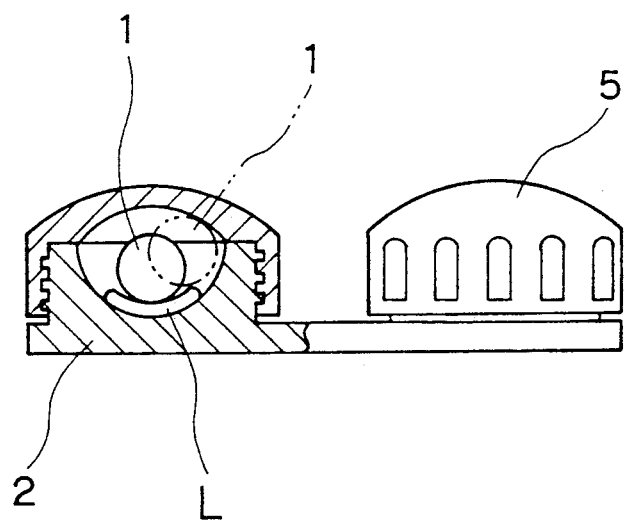
FIG. 8 is a partially sectional side elevation view showing the instrument of FIG. 7.

For the cleaning instrument shown in FIGS. 7 and 8, when the cap 5 is mounted on the cleaning vessel 2, the inside surface of the cleaning vessel 2 and the inside surface of the cap 5 do not form a complete spherical surface but form a depressed ellipsoidal shape, or a "discus-like-shape". Therefore, the substantial depth of the cleaning chambers 4a and 4b can be shallow, and the cleaning ball 1 can be prevented from moving unnecessarily. Further, since the height of whole cleaning instrument can be low, it is further convenient to carry.

Furthermore, one side of the side face of the cleaning instrument of FIGS. 7 and 8 is provided with a projection 6 between both cleaning vessels so that both front and rear sides of the cleaning vessel become definite. Therefore, right and left sides of cleaning vessels can be easily distinguished, and both right and left contact lens can be respectively housed in or taken out of the correct cleaning vessel.

Figure 9:
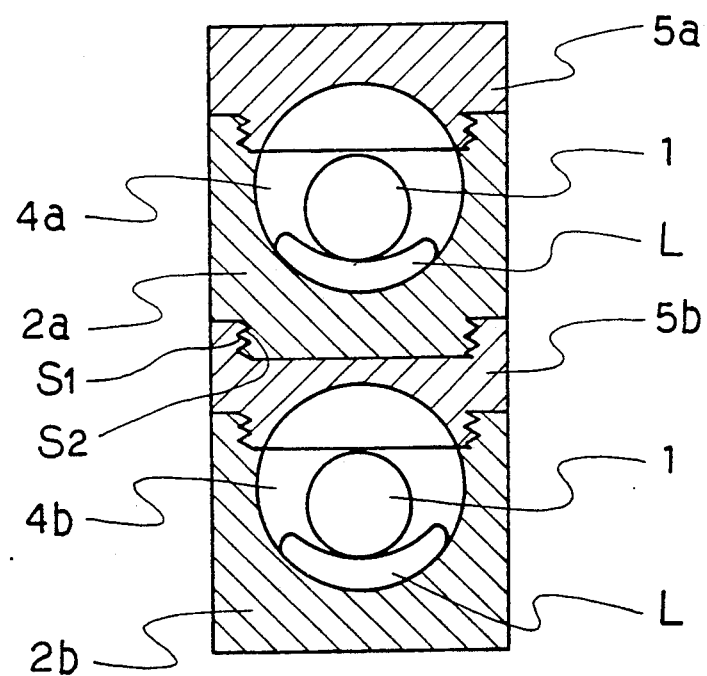
FIG. 9 is a sectional view showing another embodiment of a cleaning instrument of the present invention.

A cleaning instrument shown in FIG. 9 is composed of two sets of cleaning instruments, which are combined with each other in the axial direction.

The upper cleaning instrument comprises a cleaning vessel 2a having a thread portion $S_1$ in the lower end thereof and a cap 5a which is screwed with the upper end of the cleaning vessel 2a. Further, the lower cleaning instrument comprises a cleaning vessel 2b having a flat lower surface and a cap 5b which is screwed with the upper end of the cleaning vesel 2b.

As to the lower cleaning instrument, the cap 5b has a thread portion $S_2$ which can be screwed with the thread portion $S_1$ of the above-mentioned upper cleaning vessel 2a. Therefore, the upper cleaning vessel 2a can be coupled with the cap 5b such that the thread portion $S_1$ is engaged with $S_2$.

According to the present invention, for instance, the left-side-contact lens L is inserted into the upper side cleaning chamber and the right-side-contact lens L is inserted into the lower side cleaning chamber. Therefore, both contact lens can be cleaned at the same time by moving in the right and left directions on the desk or the like.

When a letter "L" is inscribed on the upper cap 5a and a letter "R" is inscribed on the lower cap 5b, any erroneous use (the right-side-contact lens is used in the left eye) can be conveniently prevented.

As a means for engaging the above-mentioned cap 5a, 5b with the cleaning vessel 2a, 2b and a means for engaging the upper cleaning vessel 2a with the lower cap 5a, snap engagement can be employed instead of thread engagement.

The cleaning instrument of the present invention mentioned hereinbefore can be used not only for soft contact lens, but also for hard contact lens. However, the cleaning instrument of the present invention is preferably used for a soft contact lens.

By utilizing the cleaning instrument of the present invention, a contact lens can be easily cleaned in a short time. Further, both surfaces of the lens can be cleaned at the same time.

Through several embodiments of the invention are described above, it is to be understood that the present invention is not limited to the above-mentioned embodiments, and various changes and modifications may be made in the invention without departing from the spirit and scope thereof.

What we claimed is:

1. A contact lens cleaning instrument combined with a case for storage comprising:
   a cleaning ball;
   a cleaning vessel formed with a cleaning chamber having a first recess for housing a contact lens and the cleaning ball, said first recess having a bottom concave inner surface which is complementarily curved to a curvature of the lens so that the contact lens can be mounted in face-to-face contact therebetween; and
   said cleaning chamber having a cap mounted thereon, said cap having an inside surface formed with a second recess, said first and second recess forming said cleaning chamber.

2. The cleaning instrument of claim 1 wherein said cleaning vessel is provided with a grip on an outside.

3. The cleaning instrument of claim 1 wherein an outer bottom surface of said cleaning vessel is flat.

4. The cleaning instrument of claim 1 wherein a bottom portion of said cleaning chamber is formed with a spherical shape having radius of 7 to 20 mm.

5. The cleaning instrument of claim 1 wherein a bottom portion of said cleaning ball is formed with a spherical shape having radius of 1 to 10 mm.

6. The cleaning instrument of claim 1 wherein said cleaning vessel has two cleaning chambers, each of which has at least one cleaning ball.

7. The cleaning instrument of claim 1 wherein a plurality of cleaning balls are housed in the cleaning chamber.

8. The cleaning instrument of claim 1 wherein said cleaning ball is provided with a stem.

9. The cleaning instrument of claim 1 wherein surface of said cleaning ball and/or bottom of the cleaning chamber are formed with a roughness.

10. A contact cleaning instrument according to claim 1 wherein said cap is detachably mounted on said cleaning vessel by an engagement means.

11. A contact cleaning instrument according to claim 1 wherein said second recess is a spherical surface.

12. A contact cleaning instrument according to claim 11 wherein said inner surface of said cleaning vessel and said inside surface of said cap form a complete spherical surface.

13. A contact cleaning instrument according to claim 1 wherein said second recess is an ellipsoidal surface.

14. A contact cleaning instrument according to claim 13 wherein said inside surface of said cap and said inner surface of said cleaning vessel form a depressed ellipsoidal surface.

15. A contact cleaning instrument according to claim 1 wherein said inside surface of said second recess is continuous with said inner surface of the first recess.

* * * * *